Figure 1:
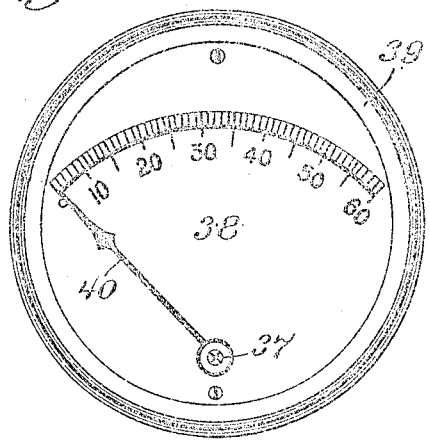

S. A. CAMPBELL.
SPEED INDICATING MACHINE.
APPLICATION FILED JUNE 10, 1907.

927,828.

Patented July 13, 1909.

Witnesses:

Inventor:

UNITED STATES PATENT OFFICE.

SOLOMON A. CAMPBELL, OF WATERTOWN, MASSACHUSETTS, ASSIGNOR TO PARKER MANUFACTURING COMPANY, OF BOSTON, MASSACHUSETTS, A CORPORATION OF WEST VIRGINIA.

SPEED-INDICATING MACHINE.

No. 927,328.  Specification of Letters Patent.  Patented July 13, 1909.

Application filed June 10, 1907. Serial No. 378,091.

*To all whom it may concern:*

Be it known that I, SOLOMON A. CAMPBELL, of Watertown, in the county of Middlesex and State of Massachusetts, have invented certain new and useful Improvements in Speed-Indicating Machines, of which the following is a specification.

This invention relates to machines adapted to be operated by a rotating element, and to indicate by a coöperating pointer and dial, the rate of speed at which the rotating element moves. A machine of this type, commonly called a "speedometer" when used with a motor vehicle, to show the rate of speed at which the vehicle travels, ought to produce what is termed an "even reading", that is, equal units of movement of the pointer for equal units of speed of the rotating element, such as the wheel of a vehicle.

To that end the present invention consists of an indicating mechanism actuated by a centrifugally-operated mechanism, which in turn is driven by the rotating element whose rate of speed is to be indicated. The centrifugally-operated mechanism includes weights, each adapted to turn about an individual pivot mounted in bearings which rotate with, and as a part of, the rotating element. When this element rotates, the weights, by reason of centrifugal force, have a tendency to turn about their individual pivots so as to recede from each other.

One of the essential features of the present invention is the means for transmitting to the pointer the movement imparted to the weights by centrifugal force. This transmitting means is so constructed that it receives a unit of movement for each unit of movement of the weights relatively to their individual pivots, and transmits such movement by equal units to the pointer. In many machines of this type, the transmitting mechanism receives from the rotating element, units of movement which vary, and so are not in proportion to those of the rotating element. This variation is in some machines caused by connections which operate through varying angles, and it may be seen in the present invention that no angular motions are employed in the transmitting mechanism.

Another important feature is the means employed to apply spring tension to oppose the centrifugal movement of the weights. This tension is applied to radial arms or levers which move with the weights, and the arms are so arranged that when in normal position they are in alinement with the line of tension. As the angles of the weights change, the angles of the spring-held arms change in such manner that the leverage afforded the springs varies directly as the centrifugal movement of the weights.

Figure 2:
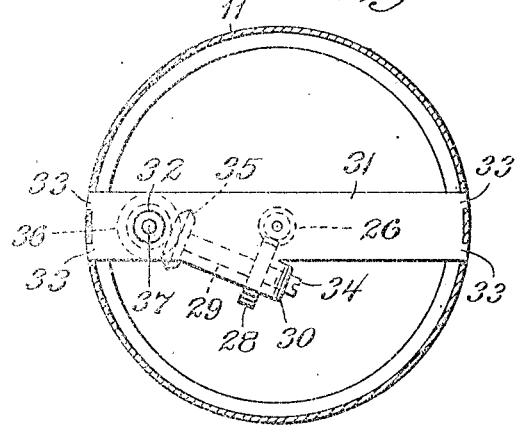
Figure 3:
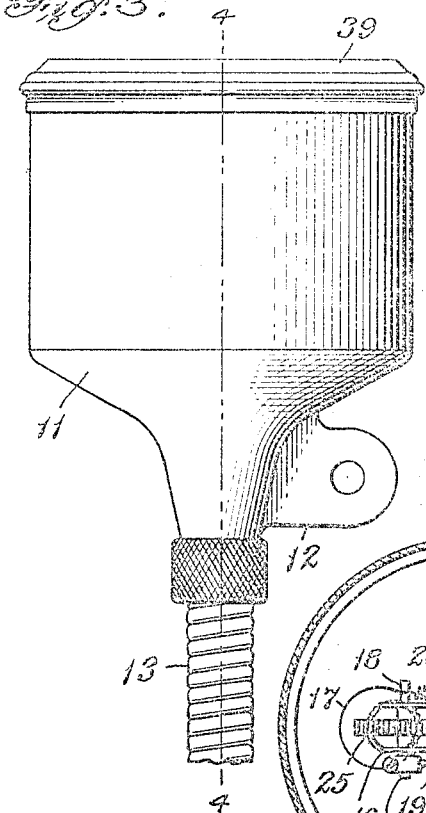
Figure 4:
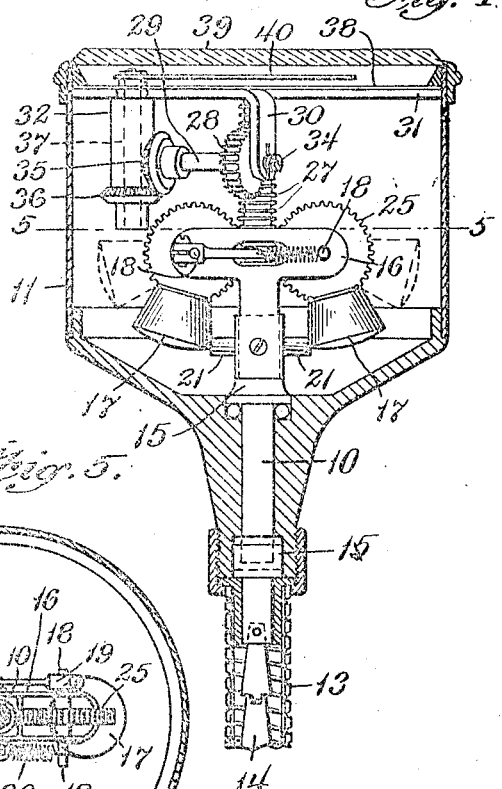
Figure 5:
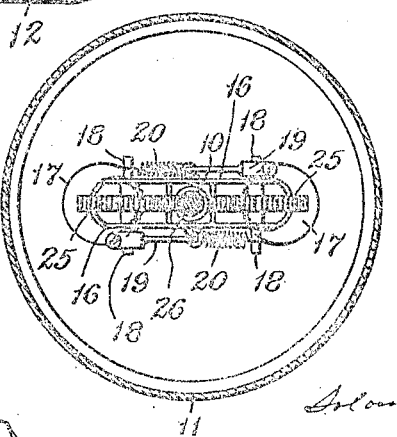

Referring now to the accompanying drawings forming a part of this specification,— Figure 1 is a top plan view of a speedometer constructed in accordance with my invention. Fig. 2 is a cross section thereof on a plane directly below the dial. Fig. 3 is an elevation, and Fig. 4 is a section of the casing on line 4—4 of Fig. 3, with the mechanism in elevation. Fig. 5 is a cross section on line 5—5 of Fig. 4.

The same reference characters indicate the same parts wherever they occur.

10 is a rotatable shaft journaled in a suitable bearing of the casing 11. The casing has an ear 12 by which it may be affixed to a support, and a flexible tube 13 inclosing a flexible drive shaft 14 connected to the outer end of the shaft 10. The shaft 10 is provided with collars 15 15 which prevent it from moving axially in relation to the casing, and with a pair of diametrically opposite T brackets 16 16 which rotate with it. The brackets are spaced sufficiently to permit the interposition of a pair of weights 17 17. The weights have trunnions 18 which are pivoted in diametrically opposite bearings in the brackets, at equal distances from the axis of the shaft 10, and they normally hang below their trunnions, and relatively close to the axis of the shaft. When the shaft rotates, it carries with it the brackets and the weights, the axes of whose trunnions extend in lines tangent to their circle of rotation about the shaft. By reason of the arrangement of the trunnions, the weights are adapted to swing away from the shaft to the positions indicated by dotted lines in Fig. 4. Each weight has an arm or lever 19 shown as adjustably clamped to a trunnion so as to turn with it. The outer end of the arm is connected to one end of a helical spring 20, of which the other end is connected to the protruding end of a trunnion of the opposite weight. One arm 19 and spring 20 are on one side of the axis of the shaft 10, and the other arm and spring are on the opposite side of the axis. By reason of this arrangement, the rotating element is evenly balanced at diametrically opposite points. When the weights are in normal position, shown by full lines in Figs. 4 and 5, they may bear against stops 21 21 which rotate with the shaft and prevent the weights from approaching too closely the common axis of rotation. In this position the radius of each arm 19 is in alinement with the direction of tension of its spring 20, and consequently the spring has no leverage or effect tending to turn the weight about its individual axis. But, on the other hand, when a maximum centrifugal force causes the weight to assume the angle shown by dotted lines, the arm 19 assumes a corresponding angle, thereby affording its spring a maximum leverage, the tension of the spring then being in a line approximately at right angles to the radius of the arm. It may therefore be seen that the leverage of the opposing force increases or decreases as well as the force itself, when the centrifugal effect on the weights increases or decreases.

For transforming the hereindescribed centrifugal movement of the weights into an indicating movement, the weights are provided each with a series of teeth 25 concentric to its individual axis.

26 is a cylindrical sleeve mounted on the shaft 10. It is free to move relatively thereto, either axially or rotatably. The sleeve is provided with a series of peripheral annular ribs 27 which intermesh with the teeth 25 of the weights in the relation of a rack and gears. In another plane the ribs intermesh with the teeth of a gear 28 which is affixed upon a shaft 29. The ends of this shaft are supported by fixed bearings, one of which is in an ear 30 on a plate 31, and the other in the exterior of a boss or sleeve 32 permanently affixed to the said plate. The latter extends diametrically from one side of the casing 11 to the other, and has tongues 33 which interlock with apertures in the casing. The introduction of the tongues into the apertures is accomplished by slightly springing the casing. The bearing in the ear 30 is in the form of a step 34 which is screwthreaded and therefore adjustable and removable. The shaft 29 is further provided with a fixed bevel gear 35 intermeshing with a bevel gear 36 affixed upon one end of a rotatable staff 37 journaled in the boss 32. The staff extends through the boss and plate 31, and also through a dial 38 which lies against the plate and is secured in the casing in any suitable way. That end of the staff which extends through the dial is provided with a hand or pointer 40, and the outer face of the dial has a gage or index consisting of a series of marks with which the pointer is adapted to coöperate as hereinafter explained. The dial and pointer are inclosed by a transparent cover 39 such as glass.

The operation of the machine is as follows:—When the weights 17 are driven so as to rotate as a unit about their common axis as hereinbefore described, and the centrifugal force thus produced causes them to change their angles, the teeth 25 of the weights move the sleeve 26 endwise in one direction. The endwise movement of the sleeve imparts rotative movement to the gear 28, shaft 29, gear 35, gear 36, staff 37 and pointer 40. For convenience of description, the pointer and dial may be termed an indicator, and the mechanism interposed between it and the toothed weights may be termed the transmitting mechanism or element. Altogether then, there is a rotating element, a transmitting element, and an indicator. By reason of employing intermeshing teeth and ribs for imparting movement to the transmitting mechanism, the latter receives equal units of movement for corresponding units of angular movement of the weights about their individual axes. And by further employing intermeshing teeth at each place in the transmitting mechanism where a change of direction occurs, the ratio of movement of each part, relatively to that of its complemental part, is maintained throughout, so that finally, the indicator receives equal units of angular movement for corresponding units of angular movement which the weights receive from centrifugal force. The tendency of the spring 20 is, of course, always to draw the weights together and consequently to actuate the transmitting mechanism and indicator in the direction opposite to that in which centrifugal force operates. So, since the latter force and its opposing force counteract each other always at a point which fluctuates as the speed of the rotating element, the indicator is caused to show each fluctuation simultaneously and in exact proportion as it occurs. The rotating weights are analogous to a ball governor and, in fact, their positions relatively to their pivots do govern the position of the indicator.

I claim:—

1. A machine of the character described, comprising a rotatable element having pivoted toothed weights adapted to be turned on their pivots by centrifugal force of rotation of the element, suitable spring tension applied to said weights so as to oppose said force, a cylindrical member concentric with and adapted to move along the axis of said rotating element, and having a series of annular peripheral ribs in intermeshed relation with said toothed weights, a relatively stationary element having a gear provided with teeth intermeshing with the ribs of said cylindrical member, and a movable indicator connected to said gear so as to be actuated thereby.

2. In a machine of the character described, a rotatable element having pivoted toothed weights adapted to be turned on their pivots by centrifugal force of rotation of the element, an axially-movable cylinder located concentrically with relation to said element, and having a series of annular peripheral ribs intermeshing with the teeth of the weights, an indicator, means interposed between said cylinder and indicator for transmitting movement of one to the other, suitable spring members, and means carried by the weights and connected to said spring members, whereby the spring tension is caused to limit centrifugal movement of the weights in proportion to the speed of the rotating element.

3. In a machine of the character described, a rotatable element, a toothed weight pivoted thereto, a toothed sleeve movable axially on said rotatable element and coöperating with said toothed weight to be moved thereby, an indicator movable in a plane substantially at right angles to the axial movement of said toothed sleeve, means actuated by said toothed sleeve for moving said indicator in one direction, and means to move said toothed weight in a direction opposite to that in which it is moved by rotation of said element.

4. In a machine of the character described, a rotatable element, a toothed sleeve axially movable on said rotatable element, gears in mesh with said toothed sleeve, weights connected with said gears to effect axial movement of the said sleeve in response to centrifugal action upon said weights, an indicator, means actuated by said toothed sleeve for moving said indicator in one direction, and means to move said weights and gears in an opposite direction to that in which they are moved by the action of centrifugal force on said weights, substantially as described.

5. In a machine of the character described, a rotatable element, a toothed sleeve axially movable on said element, gears pivoted to said rotatable element on substantially diametrically opposite sides of the toothed sleeve, and having their teeth in engagement with said toothed sleeve, weights connected to said gears, levers or arms attached to the pivots of said gears and extended toward each other on opposite sides of the rotatable element, springs connected to said levers or arms to move the said gears to their starting position, an indicator, and means actuated by the toothed sleeve for operating said indicator, substantially as described.

In testimony whereof I have affixed my signature, in presence of two witnesses.

SOLOMON A. CAMPBELL.

Witnesses:
PETER W. PEZZETTI,
A. C. RATIGAN.